United States Patent [19]

Suzuki et al.

[11] Patent Number: 5,039,382

[45] Date of Patent: Aug. 13, 1991

[54] METHOD FOR PRODUCING AN ALKALI METAL HYDROXIDE

[75] Inventors: Koji Suzuki; Yoshio Sugaya; Atsushi Watakabe; Tetsugi Shimohira, all of Yokohama, Japan

[73] Assignee: Asahi Glass Company, Ltd., Tokyo, Japan

[21] Appl. No.: 309,731

[22] Filed: Feb. 3, 1989

[30] Foreign Application Priority Data

Jun. 12, 1987 [JP] Japan ............................ 62-145155
Jun. 12, 1987 [JP] Japan ............................ 62-145157
Jun. 12, 1987 [JP] Japan ............................ 62-145158
Jun. 3, 1988 [JP] Japan ................... PCT/JP88/00537

[51] Int. Cl.$^5$ ............................................. C25B 1/16
[52] U.S. Cl. ...................................... 204/98; 204/296
[58] Field of Search ................................ 204/98, 296

[56] References Cited

U.S. PATENT DOCUMENTS

| | | | |
|---|---|---|---|
| 4,297,196 | 10/1981 | Lazarz et al. ................ | 204/296 |
| 4,402,806 | 9/1983 | Coker ........................ | 204/98 |
| 4,426,271 | 1/1984 | Yoshida et al. .............. | 204/296 |
| 4,455,210 | 9/1984 | Coker et al. ................. | 204/283 |
| 4,686,120 | 8/1987 | Johnson ..................... | 204/296 |
| 4,720,334 | 1/1988 | DuBois et al. ............... | 204/98 |

FOREIGN PATENT DOCUMENTS

| | | |
|---|---|---|
| 0066102 | 12/1982 | European Pat. Off. . |
| 58-83030 | 8/1983 | Japan . |
| 59-22930 | 5/1984 | Japan . |

OTHER PUBLICATIONS

Official Action, May 29, 1989 Application Number: 4613509/26 (021991), Filing Date Feb. 10, 1989, Asahi Glass Company Ltd., JP Koji Suzuki et al., Method for Producing Alkali Metal Hydroxide.

*Primary Examiner*—T. Tung
*Attorney, Agent, or Firm*—Oblon, Spivak, McClelland, Maier & Neustadt

[57] ABSTRACT

A method for producing an alkali metal hydroxide by electrolysis in an electrolytic cell comprising an anode compartment and a cathode compartment, which comprises supplying an aqueous alkali metal chloride solution to the anode compartment and withdrawing an aqueous alkali metal hydroxide solution from the cathode compartment, wherein a fluorine-containing cation exchange membrane comprising a first layer of an alkali resistant cation exchanger with a thickness of at least 5 $\mu$m selected from the group consisting of the following (a), (b), and (c), and a second layer of a perfluorocarbon polymer having —$CO_2M$ groups (wherein M is an alkali metal) and a water content of from 2 to 7% by weight in a 45 wt% NaOH aqueous solution with a thickness of at least 5 $\mu$m, is disposed with the first layer facing the cathode compartment;

(a) a layer of a cation exchanger having alkali resistant inorganic particles or fibrils dispersed therein,
(b) a layer of porous material of a cation exchange resin with minimum permeability, and
(c) a layer of a cation exchanger having an alkali resistant polymer having no ion exchange groups embedded therein.

13 Claims, No Drawings

METHOD FOR PRODUCING AN ALKALI METAL HYDROXIDE

The present invention relates to a method for producing an alkali metal hydroxide. More particularly, the present invention relates to a method for producing an alkali metal hydroxide in a wide range of concentration of from 20 to 55% by weight, preferably in a relatively high concentration of at least 42% by weight by an ion exchange membrane method.

A so-called ion exchange method for alkali electrolysis wherein an aqueous alkali metal chloride solution is electrolyzed by means of a fluorine-containing cation exchange membrane as a diaphragm to produce an alkali metal hydroxide and chlorine, has been commonly employed internationally in recent years, since it is thereby possible to produce a highly pure alkali metal hydroxide at a substantially low consumption of energy as compared with conventional methods.

At the initial stage in the commercial use of such an ion exchange membrane method for alkali electrolysis, it was common to use a fluorine-containing cation exchange membrane having sulfonic acid groups as the ion exchange groups, whereby it was impossible to gain high current efficiency. Therefore, in recent years, such a membrane has been replaced by a cation exchange membrane having carboxylic acid groups at least on the cathode side of the membrane, whereby the current efficiency in the electrolysis has been improved to a level of from 92 to 98%, which is practically adequate for industrial purposes.

However, it has been found that when such a carboxylic acid type cation exchange membrane is used, excellent current efficiency at a low voltage is obtainable for a long period of time only when the production is limited for an alkali metal hydroxide having a concentration of up to about 36–40% by weight. According to the study by the present inventors, current efficiency as high as from 94 to 98% is obtainable upto the alkali metal hydroxide concentration of about 40% by weight. If the alkali hydroxide concentration exceeds this limit, the current efficiency deteriorates. Further, at such a high concentration, the membrane resistance also increases abruptly, and the electrolytic cell voltage increases accordingly. If the operation is continued for a long period of time i.e. from one week to one year, the current efficiency gradually decreases. From the measurement of the ion exchange capacity of the cathode side surface of the membrane used for the operation at such a high concentration of an alkali metal hydroxide for a long period of time, it has been found that the ion exchange capacity of the surface has decreased due to the decomposition of the carboxylic acid groups. Therefore, the cation exchange membrane having carboxylic acid groups on the cathode side of the membrane is not suitable for the industrial production of an alkali metal hydroxide at such a high concentration as mentioned above.

On the other hand, U.S. Pat. No. 4,455,210 proposes to produce an alkali metal hydroxide at a high concentration by using a cation exchange membrane prepared by laminating a fluorine-containing polymer film having sulfonic acid groups on the cathode side of a fluorine-containing polymer film having sulfone amide groups. However, in this method, the initial current efficiency is low, and when the operation is continued for a long period of time, the current efficiency tends to decrease further.

Japanese Examined Patent Publication No. 9589/1982 discloses a method to obtain sodium hydroxide at a concentration of 40% by weight by using a fluorine-containing cation exchange membrane comprising a sulfonic acid group-containing layer of about 2 $\mu$m on the cathode side of a carboxylic acid group-containing layer. Other examples in which a thin sulfonic acid group-containing layer is provided on the cathode side of a membrane, are disclosed in Japanese Unexamined Patent Publication No. 83030/1983 and Japanese Examined Patent Publication No. 23776/1985, and Japanese Unexamined Patent Publication No. 22930/1984 discloses an example in which a layer of a mixture of a sulfonic acid group-containing cation exchanger and zirconia is provided on each side of a membrane. These references are all concerned with reduction of the electrolytic voltage in the production of sodium hydroxide at a concentration of about 35% weight. According to the study by the present inventors, when such a sulfonic acid group-containing layer on the cathode side is thin as disclosed, a current efficiency as high as about 95% is obtainable at an alkali metal hydroxide concentration of 40% by weight, but at an alkali metal hydroxide concentration of 45% or higher, the current efficiency is only at a level of about 90%, and the current efficiency tends to decrease as time passes.

If an alkali metal hydroxide can be produced at such a high concentration at a high current efficiency under a low electrolytic cell voltage, it is possible to save the energy which used to be required for the concentration of the alkali metal hydroxide.

It is an object of the present invention to provide a method for producing a highly concentrated alkali metal hydroxide by using an ion exchange membrane, whereby for the production of a highly concentrated alkali metal hydroxide at a level of at least 42% by weight, especially at least 45% by weight, or for the production of an alkali metal hydroxide within a wide range of concentration of from 22 to 55% by weight, especially from 25 to 50% by weight, a high current efficiency can be obtained not only during the initial stage but also during the operation for a long period of time.

The present invention has been accomplished to solve the above-mentioned problems, and provides a method for producing an alkali metal hydroxide by electrolysis in an electrolytic cell comprising an anode compartment and a cathode compartment, which comprises supplying an aqueous alkali metal chloride solution to the anode compartment and withdrawing an aqueous alkali metal hydroxide solution from the cathode compartment, wherein a fluorine-containing cation exchange membrane comprising a first layer of an alkali resistant cation exchanger with a thickness of at least 5 $\mu$m selected from the group consisting of the following (a), (b) and (c), and a second layer of a perfluorocarbon polymer having —$CO_2M$ groups (wherein M is an alkali metal) and a water content of from 2 to 7% by weight in a 45 wt % NaOH aqueous solution with a thickness of at least 5 $\mu$m, is disposed with the first layer facing the cathode compartment:

(a) a layer of a cation exchanger having alkali resistant inorganic particles or fibrils dispersed therein, (b) a layer of porous material of a cation exchange resin, and (c) a layer of a cation exchanger having an alkali resistant polymer having no ion exchange groups embedded therein.

Now, the present invention will be described in detail with reference to the preferred embodiments.

In the present invention, the thickness of the first layer is at least 5 μm, preferably from 10 to 200 μm. If the thickness is less than 5 μm, no adequate current efficiency is obtainable for the production of an alkali metal hydroxide at a concentration of at least 45% by weight, and it is not possible to adequately prevent the deterioration of the carboxylic acid groups by the high concentration of the alkali metal hydroxide. On the other hand, if the thickness exceeds 200 μm, the membrane resistance tends to be high, whereby the electrolytic voltage increases, such being undesirable.

As the alkali resistant cation exchange resin constituting the first layer, not only a hydrocarbon cation exchange resin such as a sulfonate of a styrene/divinyl benzene copolymer or a hydroxy styrene/divinyl benzene copolymer but also a perfluorocarbon polymer preferably having —SO₃M groups or —OM groups (wherein M is an alkali metal) may be employed.

The cation exchange resin constituting the second layer is a perfluorocarbon polymer having a thickness of at least 5 μm and containing —CO₂M groups (M is an alkali metal). The second layer of a perfluorocarbon polymer having —CO₂M groups (wherein M is an alkali metal) has a water content within a range of from 2 to 7% by weight, preferably from 2.5 to 5% by weight, in a 45 wt % NaOH aqueous solution. If the water content is outside this range, a sufficiently high current efficiency is hardly obtainable. Here, the water content in a 45 wt % NaOH aqueous solution is defined by the formula:

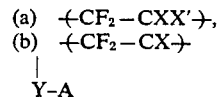

where a is the weight (g) of a cation exchange membrane which has been hydrolyzed, then immersed in a 45 wt % NaOH aqueous solution at the temperature of electrolysis for 16 hours, cooled to 25° C. and wiped for the removal of the aqueous solution from the membrane surface, and b is the weight (g) of the membrane after it has been further immersed in deionized water at 90° C. for 16 hours and vacuum-dried at 130° C. for 16 hours.

In the present invention, the ion exchange resin constituting the first layer is preferably a perfluorocarbon polymer having —SO₃M groups or —OM groups. The ion exchange capacity of the perfluorocarbon polymer having —SO₃M groups is preferably from 0.6 to 1.8 meq/g dry resin, more preferably from 0.85 to 1.6 meq/g dry resin. The ion exchange capacity of the perfluorocarbon polymer containing —OM groups is preferably from 0.6 to 2.8 meq/g dry resin, more preferably from 0.85 to 2.5 meq/g dry resin. The water content of the ion exchange resin constituting the first layer in a 45 wt % NaOH aqueous solution is preferably higher than that of the second layer by at least 3%, more preferably at least 5%, but not higher than 30%, preferably not higher than 25%.

The second layer is preferably made of a perfluorocarbon polymer having —CO₂M groups (M is an alkali metal), and the ion exchange capacity thereof is preferably from 0.6 to 1.8 meq/g dry resin, more preferably from 0.85 to 1.6 meq/g dry resin.

In the present invention, the perfluorocarbon polymer is meant for a fluorinated hydrocarbon polymer wherein the proportion in number of fluorine atoms in the total number of hydrogen and halogen atoms bonded to carbon atoms, is at least 90%. The perfluorocarbon polymer constituting the above-mentioned first or second layer is preferably a copolymer of at least two types of monomers, and particularly preferred is a copolymer having the following repeating units (a) and (b):

(a) $+CF_2-CXX'+$,
(b) $+CF_2-CX+$
    $\phantom{+CF_2-}|$
    $\phantom{+CF_2-}Y-A$ wherein each of X and X' is —F, —Cl, —H or —CF₃, A is —SO₃M, —CRfRf'OM or —COOM (wherein M is hydrogen or an alkali metal, and each of Rf and Rf' is a perfluoroalkyl group having from 1 to 10 carbon atoms) or a group which can be converted to such groups by hydrolysis, and Y is selected from the following groups:

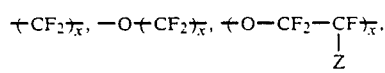

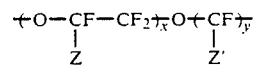

wherein each of Z and Z' is —F or a perfluoroalkyl group having from 1 to 10 carbon atoms, and each of x and y is an integer of 1 to 10.

In addition to the repeating units (a) and (b), the copolymer may further contain the following repeating units:

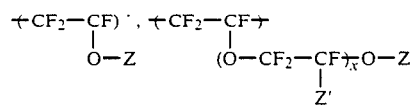

The content of the repeating unit (b) in the above polymer is selected so that the resulting fluorine-containing polymer has the above-mentioned ion exchange capacity.

The above-mentioned fluorine-containing polymer is preferably a perfluoropolymer when hydrolyzed. Preferred examples include a copolymer of CF₂=CF₂ with CF₂=CFOCF₂CF(CF₃)OCF₂CF₂SO₂F, a copolymer of CF₂=CF₂ with CF₂=CFO(CF₂)₂₋₅SO₂F, a copolymer of CF₂=CF₂ with CF₂=CFOCF₂CF₂C(CF₃)₂OH, a copolymer of CF₂=CF₂ with CF₂=CFO(CF₂)₂₋₅COOCH₃, and a copolymer of CF₂=CF₂ with CF₂=CFOCF₂CF(CF₃)O(CF₂)₂₋₅COOCH₃.

In the present invention, the inorganic particles or fibrils dispersed in the first layer (a) have alkali resistance and are preferably insoluble in a 45 wt % NaOH aqueous solution at the electrolytic temperature. Such alkali resistant inorganic material is preferably at least one member selected from the group consisting of oxides, nitrides, carbides and hydroxides of elements of the third period et seq of Groups IIa, IIIb, IVb, Vb, IIIa and IVa of the long form of the periodic table. Among them, particularly preferred is selected from the group consisting of oxides, nitrides, carbides and hydroxides of titanium, zirconium, niobium, hafnium, tantalum, indium and tin, and silicon nitride and silicon carbide. Such alkali resistant inorganic material is incorporated preferably in a volume ratio (volume of alkali resistant inorganic material/volume of alkali resistant inorganic material plus volume of cation exchange resin) of at most 95%, more preferably from 20 to 80%, in the first layer, preferably uniformly. In this case, the average particle size of the inorganic particles or the average diameter of the fibrils is preferably at most ½ of the thickness of the first layer and at most 20 μm, preferably at most 10 μm. If the particle size or the fibril diameter is outside this range, the current efficiency or the durability tends to deteriorate, although the reason is not clearly understood.

The porous body of the cation exchange resin for the first layer (b) in the present invention has a porosity of from 5 to 95%, especially from 10 to 80%. Here, the porosity is represented by the following equation:

$$\text{Porosity } (\%) = (1 - a/p.d) \times 100$$

where $\rho(g/cm^3)$ is the specific gravity of the cation exchange resin, a $(g/cm^2)$ is the weight per unit area, and d (cm) is the thickness of the porous material.

There is no particular restriction as to the method for the preparation of such porous material. However, in a preferred method, a cation exchanger constituting the first layer or its precursor preferably containing from 5 to 95% by volume, more preferably from 20 to 80% by volume, of alkali-soluble inorganic material such as $SiO_2$, Al or $Al(OH)_3$ particles, hydrocarbon type or fluorine-containing type low molecular weight organic compound, polymer or surfactant (hereinafter referred to as a pore-forming agent) is formed into a film, which is then immersed in e.g. a solution containing an alkali and/or water to elute the above-mentioned pore-forming agent. The porous layer thus obtained preferably has minimum permeability at least in a state not wetted with a liquid such as water or an aqueous alkaline solution after the formation of the layer. In the present invention, the permeability is evaluated by the period of time in seconds during which 100 ml of air passes through an area of 6.45 cm$^2$ under a pressure difference of 0.0132 kg/cm$^2$, and the numerical value is preferably at least 300, more preferably at least 1,000. With a porous material having a permeability greater than this limit, an alkali metal hydroxide having a high concentration is likely to penetrate from the cathode compartment to the surface of the carboxylic acid layer, such being undesirable. Under a practical electrolytic condition, in some cases, such a porous layer may have fine pores due to e.g. an influence of the flow of ions.

In the present invention, the alkali resistant polymer having no ion exchange groups embedded in the first layer (c) includes an alkali-resistant polymer containing a hydrocarbon polymer having no substantial ion exchange groups. By its presence, the mechanical strength of the first layer can be reinforced, and the creeping properties will be improved. The material is preferably a fluorocarbon polymer, particularly perfluorocarbon polymer, and it may be used in various forms, preferably in the form of webs such as non-woven fabrics or woven fabrics as disclosed in Japanese Examined Patent Publication No. 19909/1979 or fibrils. A web such as a non-woven fabric or woven fabric preferably has a porosity of from 30 to 95%, more preferably from 40 to 85%, and its thickness is selected within a range of from 10 to 200 μm within the range of the first layer. The thickness of the web can be measured, for example, by sandwiching the woven fabric by thin films of a polyethylene terephthalate having a known thickness, and measuring the entire thickness by a micrometer. The porosity of the web can be calculated from the following equation by measuring the specific gravity $\rho'(g/cm^3)$ of the material constituting the web, the thickness d'(cm) of the web and the weight a'(g/cm$^2$) per unit area:

$$\text{Porosity } (\%) = (1 - a'/p.d') \times 100$$

Fibrils which may be employed in the present invention are disclosed, for example, in Japanese Unexamined Patent Publication No. 149881/1978. Preferred perfluorocarbon polymers include a polytetrafluoroethylene, a tetrafluoroethylene/ hexafluoropropylene copolymer, tetrafluoroethylene/perfluoropropyl vinyl ether copolymer and a tetrafluoroethylene/perfluoromethyl vinyl ether copolymer.

The cation exchange membrane of the present invention may be prepared by the following wet system film-forming method as well as by a usual extrusion film-forming method wherein preliminarily prepared first and second layers are laminated.

For example, alkali-resistant inorganic particles or fibrils are dispersed in a solution or dispersion of a perfluorocarbon polymer having $-SO_3M'$ groups (wherein M' is hydrogen or an alkali metal) to obtain a dispersion, which is then directly coated on a film of the second layer or a layer of its precursor, followed by drying. Otherwise, such a dispersion is coated and dried on other substrate or film to obtain a film of the first layer, which is then combined with a second layer or a layer of its precursor, preferably followed by heat pressing for lamination. Further, a layer other than the first layer may also be formed by a wet system film forming method A polymer solution having such a fluorine containing polymer dissolved or dispersed is disclosed, for example, in Japanese Unexamined Patent Publications No. 72022/1981 and No. 192464/1982 and Japanese Examined Patent Publication No. 13333/1973, and such a polymer solution can be used.

In the present invention, the above-mentioned alkali resistant inorganic particles or fibrils used in (a) mentioned above and the alkali-soluble inorganic material used in (b) mentioned above or/and the alkali resistant polymer having no substantial ion exchange groups used in (c) mentioned above may be incorporated at the same time in the first layer. A porous membrane, cloth or fibrils of e.g. polytetrafluoroethylene may be employed for the reinforcement of the cation exchanger or other alkali resistant substance-containing cation exchanger, whereby the resistance against peeling of said layer or against the formation of cracks will be improved, and as compared with the membrane wherein said layer is not reinforced. Thus, not only the overall mechanical strength of the membrane is improved, but also it is possible to obtain a cation exchange membrane having a excellent stability of the current efficiency for a long period of time.

In the fluorine-containing cation exchange membrane to be used in the present invention, a third layer may be laminated, if necessary, in addition to the first and second layers. As such a preferred embodiment, the fluorine-containing cation exchange membrane has, on the anode side of the second layer, a third layer of a perfluorocarbon polymer having cation exchange groups and having a specific resistance lower than the second layer and a thickness greater than the second layer. Further, the fluorine-containing cation exchange membrane may have, on the anode side of the second layer or the third layer, a fourth layer of a porous fluorine-containing polymer having a thickness of from 10 to 450 μm and a porosity of from 30 to 95% with its surface and interior being hydrophilic. By laminating such third layer or fourth layer, the properties of the membrane such as mechanical strength can further be stabilized over the membrane composed solely of the first and second layers.

In addition to the above, a bonding layer may be provided to the fluorine-containing polymer used in the present invention in order to firmly bond the above first, second, third and/or fourth layer, as the case requires. Such a bonding layer may be a layer of a blend comprising a fluorine-containing polymer having sulfonic acid groups or hydroxyl groups and a fluorine-containing polymer having carboxylic acid groups preferably in a weight ratio of from 4/1 to $\frac{1}{4}$ or a layer of a fluorine-containing polymer containing both sulfonic acid groups or hydroxyl groups and carboxylic acid groups, preferably in a ratio of from 2/1 to $\frac{1}{2}$, preferably having a thickness of from 5 to 50 μm. Such a bonding layer may be inserted at the time of bonding the first and second layers or optionally a third layer thereto, followed by heating for melt bonding.

Further, to the fluorine-containing cation exchange membrane of the present invention, a reinforcing material such as a web such as woven fabric or non-woven fabric of e.g. polytetrafluoroethylene may be embedded if necessary, preferably in the second, third or fourth layer near the anode side.

The fluorine-containing cation exchange membrane thus formed and being useful for the present invention preferably has an overall thickness of from 50 to 600 μm, more preferably from 150 to 400 μm.

The above-mentioned fluorine-containing cation exchange membrane may be used as it is. Preferably, however, a means for releasing gas bubbles is provided on at least one surface of the cation exchange membrane. Namely, a means for releasing chlorine gas is provided on the anode side, and a means for releasing hydrogen gas in provided on the cathode side Particularly, at least the anode side surface of the cation exchange membrane is treated for releasing chlorine gas to further improve the stability of the current efficiency for a long period of time.

As the method for the treatment of the surface of the ion exchange membrane for releasing the chlorine gas, there may be mentioned a method wherein fine irregularities (concave-convex) are formed on the membrane surface (Japanese Examined Patent Publication No. 26495/1975), a method wherein hydrophilic inorganic particles are deposited on the membrane surface by supplying an electrolyte containing inorganic ions such as iron or zirconia ions to the electrolytic cell (Japanese Unexamined Patent Publication No. 152980/1981), or a method wherein a gas and liquid permeable porous layer containing electrocatalytically inactive particles (Japanese Unexamined Patent Publications No. 75583/1981 and No. 39185/1982) is provided. Such a gas-releasing layer on the surface of the ion exchange membrane serves not only to improve the stability of the current efficiency for a long period of time, but also to further reduce the cell voltage during the electrolysis.

The electrolysis of an alkali metal chloride aqueous solution by means of the fluorine-containing cation exchange membrane of the present invention may be conducted under known conditions as disclosed in the above-mentioned Japanese Unexamined Patent Publication No. 112398/1969. For instance, the electrolysis is conducted by supplying an aqueous alkali metal chloride solution of up to about saturated concentration, preferably from 2.5 to 5.0 N into the anode compartment and, if necessary, water or dilute alkali metal hydroxide into the cathode compartment to maintain the alkali metal hydroxide concentration at a desired level, preferably at a temperature of from 50 to 120° C. at a current density of from 10 to 100 A/dm$^2$. An aqueous alkali metal hydroxide solution having from 20 to 55% by weight, preferably from 42 to 50% by weight is produced and withdrawn from the cathode compartment. In such a case, it is preferred to minimize the presence of heavy metal ions such as calcium or magnesium in the aqueous alkali metal chloride solution, since such heavy metal ions bring about a deterioration of the ion exchange membrane. Further, in order to prevent as far as possible the generation of oxygen at the anode, an acid such as hydrochloric acid may be added to the aqueous alkali metal chloride solution.

In the present invention, the electrolytic cell may be a monopolar type or bipolar type, so long as the above construction is employed. With respect to the material constituting the electrolytic cell, for instance, in the case of the anode compartment for the electrolysis of an aqueous alkali metal chloride solution, a material resistant to an aqueous alkali metal chloride solution and chlorine, such as a valve metal like titanium, may be used, and in the case of the cathode compartment, iron, stainless steel or nickel resistant to an alkali metal hydroxide and hydrogen, may be used.

In the present invention, when an electrode is to be installed, it may be disposed in contact with the cation exchange membrane, or may be disposed with a space from the membrane. Particularly in the case of the present invention, an advantageous cell voltage resulting from the low membrane resistance, can be obtained without any trouble when the electrode is disposed in contact with the membrane.

Now, the present invention will be described with reference to Examples. However, it should be understood that the present invention is by no means restricted to these specific Examples.

EXAMPLE 1

A porous polytetrafluoroethylene film having a thickness of 120 μm and a pore diameter of 2 μm was laminated with a film of a $CF_2=CF_2/CF_2=CFO(CF_2)_3—COOCH_3$ copolymer (copolymer A) having an ion exchange capacity of 1.25 meq/g dry resin and a thickness of 40 μm. Then, on the copolymer A layer, an ethanol solution containing a $CF_2=CF_2/CF_2=CFOCF_2CF(CF_3)O(CF_2)_2SO_3H$ copolymer (copolymer B) having an ion exchange capacity of 1.1 meq/g dry resin and $ZrO_2$ particles having an average particle size of 5 μm in a volume ratio of 3/2 was coated and dried to form a layer of the mixture of copolymer B and $ZrO_2$ having a thickness of 50 μm, followed by heat pressing at 120° C. Then, to the interior of the porous material, a solution containing copolymer B and zirconyl chloride was impregnated, followed by drying to obtain a multi-layer membrane having hydrophilic nature imparted to the inner wall of the porous material Then, a solution obtained by dispersing $ZrO_2$ particles in a solution of copolymer B was spray-coated on both sides of the above multi-layer membrane to obtain a multi-layer membrane having fine $ZrO_2$ particles bonded thereto.

The multi-layer membrane thus obtained was hydrolyzed with an aqueous sodium hydroxide solution. Then, on the side of the layer comprising the copolymer B and $ZrO_2$ having a thickness of 50 μm, a cathode prepared by subjecting a SUS 304 punched metal to etching treatment in an aqueous solution containing 52% by weight of sodium hydroxide at 150° C. for 52 hours and having a low hydrogen overvoltage, was disposed to contact therewith, whereas on the opposite side of the membrane, an anode prepared by coating a solid solution of ruthenium oxide, iridium oxide and titanium oxide on a titanium punched metal and having a low chlorine overvoltage, was disposed to contact therewith. Then, electrolysis was conducted at 90° C. at a current density of 30 A/dm$^2$ while supplying 300 g/liter of an aqueous sodium chloride solution to the anode compartment and maintaining the concentration of the aqueous sodium chloride solution discharged from the anode compartment at a level of 200 g/liter. The sodium hydroxide concentration in the cathode compartment was maintained at a level of 45% by weight by adding water to the cathode compartment. The current efficiency was 95% and the cell voltage was 3.0 V. No deterioration in the current efficiency was observed by continuous operation of the electrolysis for three months.

The water contents of the films of the copolymer A and copolymer B in 45 wt % NaOH were 3.1% and 16.6%, respectively.

COMPARATIVE EXAMPLE 1

The electrolysis was conducted in the same manner as in Example 1 except that instead of the layer of the mixture of copolymer B and $ZrO_2$, a layer of copolymer B having a thickness of 50 μm was formed by coating an ethanol solution containing copolymer B only, whereby the current efficiency was 95%, and the cell voltage was 3.0 V. The current efficiency after the electrolysis for three months was 93%. The membrane was taken out and examined, whereby partial peeling of the copolymer B layer was observed along the periphery of the electrolytic surface.

COMPARATIVE EXAMPLE 2

The electrolytic experiment was conducted in the same manner as in Example 1 except that the layer of the mixture of copolymer B and $ZrO_2$ was not provided, whereby the initial current efficiency was 92% and the cell voltage was 3.1 V. By the electrolysis for one month, the current efficiency dropped to 87%.

EXAMPLE 2

The electrolytic experiment was conducted in the same manner as in Example 1 except that no treatment for releasing chlorine and hydrogen bubbles was conducted, whereby the initial current efficiency was 95% and the cell voltage was 3.5 V.

COMPARATIVE EXAMPLE 3

The electrolytic experiment was conducted in the same manner as in Example 1 except that the layer of the mixture of copolymer B and $ZrO_2$ was not provided on the cathode side of the copolymer A layer and no treatment for releasing chlorine and hydrogen bubbles was conducted, whereby the initial current efficiency was 92%, and the cell voltage was 3.6 V, and the current efficiency dropped as time passed.

EXAMPLE 3

The electrolytic experiment was conducted in the same manner as in Example 1 except that instead of the porous film of polytetrafluoroethylene on the anode side of the copolymer A layer, a film of a $CF_2=CF/CF_2=CFOCF_2CF(CF_3)O(CF_2)_2SO_2F$ copolymer having an ion exchange capacity of 1.1 meq/g dry resin and a thickness of 160 μm was used, whereby the current efficiency was 95%, and the cell voltage was 3.2 V, and the performance was constant for one month.

EXAMPLE 4

The electrolytic experiment was conducted in the same manner as in Example 1 except that instead of $ZrO_2$ particles in Example 1, SiC whiskers having an average diameter of 4 μm were used in a volume ratio of 40% to copolymer B, whereby the current efficiency was 94%, and the cell voltage was 3.0 V.

EXAMPLES 5 to 8

The electrolytic experiments were conducted in the same manner as in Example 1, except that instead of $ZrO_2$ particles, various inorganic particles were dispersed in the layer of copolymer B in various proportions. The results are shown in Table 1.

TABLE 1

|  | Inorganic particles | Average particle size | Volume ratio | Current efficiency | Cell voltage |
| --- | --- | --- | --- | --- | --- |
| Example 5 | SiC | 0.3 μm | 50% | 95% | 3.0 V |
| Example 6 | $HfO_2$ | 6 μm | 30% | 94% | 3.0 V |
| Example 7 | $Si_3N_4$ | 1 μm | 50% | 94% | 3.0 V |
| Example 8 | $Ce(OH)_4$ | 5 μm | 40% | 95% | 3.0 V |

EXAMPLE 9

A porous polytetrafluoroethylene film having a thickness of 120 μm and a pore diameter of 2 μm was laminated with a film of a $CF_2=CF_2/CF_2=CFO(CF_2)_3—COOCHhd$ copolymer (copolymer A) having an ion exchange capacity of 1.25 meq/g dry resin having a thickness of 40 μm. Then, on the copolymer A layer, an ethanol solution containing a $CF_2=CF_2/CF_2=CFOCF_2CF(CF_3)O(CF_2)_2SO_3H$ copolymer (copolymer B) and $SiO_2$ particles having an average particle size of 5 μm in a volume ratio of 3/2 was coated and dried to form a layer of the mixture of copolymer B and $SiO_2$ having a thickness of 50 μm, followed by heat pressing at 120° C. Then, to the interior of the porous material, a solution containing copolymer B and zirconyl chloride was impregnated under reduced pressure, followed by drying to obtain a multi-layer membrane having hydrophilic nature imparted to the inner wall of the porous material.

Then, a solution obtained by dispersing $ZrO_2$ particles in a solution of copolymer B was spray-coated on both sides of the above multi-layer membrane to obtain a multi-layer membrane having fine $ZrO_2$ particles bonded thereto.

The multi-layer membrane thus obtained was hydrolyzed with an aqueous sodium hydroxide solution. Then, on the side of the layer of porous copolymer B with a porosity of 40% as a result of elution of $SiO_2$ and having a thickness of 50 μm, a cathode prepared by subjecting a SUS 304 punched metal to etching treatment in an aqueous solution containing 52% by weight of sodium hydroxide at 150° C. for 52 hours and having a low hydrogen overvoltage, was disposed to contact therewith, whereas on the opposite side of the membrane, an anode prepared by coating a solid solution of ruthenium oxide, iridium oxide and titanium oxide on a titanium punched metal and having a low chlorine overvoltage, was disposed to contact therewith. Then, electrolysis was conducted at 90° C. at a current density of 30 A/dm$^2$ while supplying 210 g/liter of an aqueous sodium chloride solution to the anode compartment and maintaining the sodium hydroxide concentration in the cathode compartment at a level of 45% by weight, whereby the current efficiency was 95% and the cell voltage was 3.0 V. No deterioration in the current efficiency was observed by continuous operation of the electrolysis for three months.

The water contents of the films of the copolymer A and copolymer B in 45 wt % NaOH were 3.1% and 16.6%, respectively.

The porous copolymer B layer had a Gurley number of at least 3,000.

EXAMPLE 10

The electrolytic experiment was conducted in the same manner as in Example 9 except that no treatment for releasing chlorine and hydrogen bubbles was conducted, whereby the initial current efficiency was 95% and the cell voltage was 3.5 V.

COMPARATIVE EXAMPLE 4

The electrolytic experiment was conducted in the same manner as in Example 9 except that the layer of the mixture of copolymer B and $SiO_2$ was not provided, whereby the initial current efficiency was 92% and the cell voltage was 3.1 V. By the electrolysis for one month, the current efficiency dropped to 87%.

COMPARATIVE EXAMPLE 5

Electrolysis was conducted in the same manner as in Example 9 except that instead of the layer of the mixture of copolymer B and $SiO_2$, a layer of copolymer B having a thickness of 50 μm was formed by coating an ethanol solution containing copolymer B only, whereby the current efficiency was 95%, and the cell voltage was 3.0 V. The current efficiency after the electrolysis for three month was 93%. The membrane was taken out and examined, whereby partial peeling of the copolymer B layer was observed along the periphery of the electrolytic surface.

COMPARATIVE EXAMPLE 6

The electrolytic experiment was conducted in the same manner as in Example 9 except that the layer of porous copolymer B formed by elution of $SiO_2$ was not provided on the cathode side of the copolymer A layer and no treatment for releasing chlorine and hydrogen bubbles was conducted, whereby the initial current efficiency was 92%, and the cell voltage was 3.6 V, and the current efficiency dropped as time passed.

EXAMPLE 11

The electrolytic experiment was conducted in the same manner as in Example 9 except that instead of the porous film of polytetrafluoroethylene on the anode side of the copolymer A layer, a film of a $CF_2=CF_2/CF_2=CFOCF_2CF_2CF_2COOCH_3$ copolymer (copolymer C) copolymer having an ion exchange capacity of 1.44 meq/g dry resin and a thickness of 160 μm was used, whereby the current efficiency was 95%, and the cell voltage was 3.2 V, and the performance was constant for one month.

EXAMPLE 12

In Example 9, a film of copolymer A having a thickness of 40 μm and a film of copolymer C having a thickness of 160 μm were heat-pressed for lamination, and on the copolymer A side, a film of a $CF_2=CF_2/CF_2=CFOCF_2CF_2C(CF_3)OH$ copolymer (copolymer D) having an ion exchange capacity of 1.5 meq/g dry resin and a thickness of 60 μm containing 50% by volume of $C_8F_{17}SO_3NH_4$ was laminated.

Then, a solution prepared by dispersing $ZrO_2$ particles in a solution of copolymer B was spray-coated on both sides of the above multi-layer membrane to obtain a multi-layer membrane having fine $ZrO_2$ particles deposited thereon.

The multi-layer membrane thus obtained was hydrolyzed with an aqueous sodium hydroxide solution and then thoroughly immersed in deionized water to obtain a layer of porous copolymer D with a porosity of 50% as a result of elution of $C_8F_{17}SO_3NH_4$ and having a thickness of 50 μm. On such porous copolymer D layer side, the cathode having a low hydrogen overvoltage was disposed to contact therewith, whereas on the opposite side of the membrane, the anode having a low chlorine overvoltage was disposed to contact therewith. Then, electrolysis was conducted at 90° C. at a current density of 30 A/dm$^2$ while maintaining the sodium hydroxide concentration in the cathode compartment at a level of 45% by weight, whereby the current efficiency was 94%, and the cell voltage was 3.2 V. No deterioration in the current efficiency was observed by continuous operation of the electrolysis for one month.

EXAMPLE 13

A porous film of polytertrafluoroethylene having a pore diameter of 2 μm and a thickness of 120 μm was laminated with a film of a $CF_2=CF_2/CF_2=CFO(CF_2)_3—COOCH_3$ copolymer (copolymer A) having an ion exchange capacity of 1.25 meq/g dry resin and a thickness of 40 μm. Then, on the copolymer A layer side of the laminated membrane, a porous film of polytetrafluoroethylene having a pore diameter of 0.5 μm and a thickness of 30 μm was laminated, and an ethanol solution of a $CF_2=CF_2/CF_2=CFOCF_2CF(CF_3)O(CF_2)_2SO_3H$ copolymer (copolymer B) was repeatedly sprayed to the porous film to fill copolymer B in the interior of the porous film. At the same time, a layer of copolymer B was formed on the surface. Then, into the interior of the porous film on the other side, a solution containing copolymer B and zirconyl chloride was impregnated under reduced pressure, followed by drying to obtain a multi-layer membrane having hydrophilic nature imparted to the porous inner wall.

Then, a solution obtained by dispersing $ZrO_2$ particles in a solution of copolymer B was spray-coated on both the porous film side and the copolymer B side to obtain a multi-layer membrane having fine $ZrO_2$ particles bonded thereto.

The multi-layer membrane thus obtained was hydrolyzed with an aqueous sodium hydroxide solution. Then, on the copolymer B layer side, a cathode prepared by subjecting a SUS 304 punched metal to etching treatment in an aqueous solution containing 52% by weight of sodium hydroxide at 150° C. for 52 hours and having a low hydrogen overvoltage, was disposed to contact therewith, whereas on the opposite side of the membrane, an anode prepared by coating a solid solution of ruthenium oxide, iridium oxide and titanium oxide on a titanium punched metal and having a low chlorine overvoltage, was disposed to contact therewith. Then, electrolysis was conducted at 90° C. at a current density of 30 A/dm$^2$ while supplying 210 g/liter of an aqueous sodium chloride solution to the anode compartment and maintaining the sodium hydroxide concentration in the cathode compartment at a level of 45% by weight, whereby the current efficiency was 95% and the cell voltage was 3.0 V. No deterioration in the current efficiency was observed by continuous operation of the electrolysis for three months, and no abnormality was observed by the inspection of the membrane after the electrolysis.

The water contents of the films of the copolymer A and copolymer B in 45 wt % NaOH were 3.1% and 16.6%, respectively.

COMPARATIVE EXAMPLE 7

The electrolytic experiment was conducted in the same manner as in Example 13 except that 50 μm of a layer of copolymer B having no porosity was formed on the cathode side of the copolymer A layer by coating a solution of copolymer B, whereby the current efficiency was 95%, and the cell voltage was 3.0 V. The current efficiency after the electrolysis for three months was 93%. The membrane was taken out from the electrolytic cell and inspected, whereby partial peeling of the copolymer B layer was observed along the periphery of the electrolytic surface.

COMPARATIVE EXAMPLE 8

The electrolytic experiment was conducted in the same manner as in Example 13 except that the layer comprising copolymer B and the porous film of polytetrafluoroethylene was not provided on the cathode side of the copolymer A layer, whereby the initial current efficiency was 92%, and the cell voltage was 3.1 V. One month later, the current efficiency dropped to 87%.

EXAMPLE 14

The electrolytic experiment was conducted in the same manner as in Example 13 except that no treatment for releasing chlorine and hydrogen bubbles was conducted, whereby the initial current efficiency was 95%, and the cell voltage was 3.5 V.

COMPARATIVE EXAMPLE 9

The electrolytic experiment was conducted in the same manner as in Example 13 except that the layer comprising copolymer B and the porous film of polytetrafluoroethylene was not provided on the cathode side of the copolymer A layer and no treatment for releasing chlorine and hydrogen bubbles was conducted, whereby the initial current efficiency was 92%, and the cell voltage was 3.6 V. The current efficiency dropped as time passed.

EXAMPLE 15

A woven fabric made of polytetrafluoroethylene yarns of 100 De was flattened to obtain a cloth having a porosity of 76% and a thickness of 45 μm. On the other hand, a paste comprising a mixture of methyl cellulose, water, cyclohexanol and cyclohexane containing 30% by weight of $ZrO_2$ was coated and dried on a film of polyethyleneterephthalate to form a $ZrO_2$ porous layer. Then, the porous layer was transferred to a film (film A) of a $CF_2=CF_2/CF_2=CFO(CF_2)_3COOCH_3$ copolymer (copolymer E) having an ion exchange capacity of 1.32 meq/g dry resin and a thickness of 160 μm by heat pressing. Then, on the side opposite to the porous layer of film A, the above-mentioned woven fabric was laminated by mild heat pressing.

Then, an ethanol solution of copolymer B was repeatedly coated on the woven fabric side to form a layer comprising copolymer B and the woven fabric and having a thickness of 50 μm on the copolymer E layer. Further, on that layer, fine $ZrO_2$ particles were deposited in the same manner as in Example 13.

The multi-layer membrane thus obtained was immersed in an aqueous sodium hydroxide solution, and the electrolysis was conducted in the same manner as in Example 13, whereby the current efficiency was 94%, and the cell voltage was 3.3 V. No deterioration in the current efficiency was observed even after the continuous electrolysis for three months. The membrane was taken out and inspected, whereby no abnormality was observed.

The water contents of the films of copolymer E and copolymer B in a 45 wt % NaOH aqueous solution were 3.2% and 16.6%, respectively.

EXAMPLE 16

A film of a $CF_2=CF_2/CF_2=CFO(CF_2)_3COOCH_3$ copolymer (copolymer A) having an ion exchange capacity of 1.25 meq/g dry resin and a thickness of 20 μm was laminated with a film of a $CF_2=CF_2/CF_2=CFO(CF_2)_3COOCH_3$ copolymer (copolymer C) having an ion exchange capacity of 1.44 meq/g dry resin and a thickness of 140 μm to obtain a laminated membrane. On the copolymer C layer side of the laminated membrane, a 30 μm film of a mixture comprising copolymer C and a $CF_2=CF_2/CF_2=CFOCF_2CF(CF_3)O(CF_2)_2SO_2F$ (copolymer B') having an ion exchange capacity of 1.1 meq/g dry resin in a weight ratio of 1:1, a 80 mesh combined yarn fabric comprising polytetrafluoroethylene yarns of 100 denier and multi-filament polyester yarns each composed of six filaments of 5 denier, in a ratio of 1:2 by number of yarns and a 10 μm film of copolymer B' were laminated so that the copolymer B' layer became the outer most layer, to obtain a laminated reinforced multi-layer membrane (1).

Then, on the copolymer B' layer side of the multi-layer membrane (1), a $ZrO_2$ porous layer formed by a paste composed of a mixture comprising methyl cellulose, water, cyclohexanol and cyclohexane containing 30% by weight of $ZrO_2$, was laminated to obtain a multi-layer memberane (2) provided with a layer for releasing chlorine gas bubbles.

Then, on the copolymer A layer side of the multi-layer membrane (2), a paste of a mixture comprising an ethanol solution of an acid type copolymer B and $ZrO_2$ particles having a particle size of 5 μm, was coated and dried to obtain a multi-layer membrane (3) provided with a ZrO$_2$-containing copolymer B layer.

The multi-layer membrane thus obtained was hydrolyzed with an aqueous sodium hydroxide solution. Then, on the side of the ZrO$_2$-containing copolymer B layer laminated on the copolymer A side, a cathode prepared by subjecting a SUS 304 punched metal to etching treatment in an aqueous solution containing 52% by weight of sodium hydroxide at 150° C. for 52 hours and having a low hydrogen overvoltage, was disposed to contact therewith, whereas on the opposite side of the membrane, an anode prepared by coating a solid solution of ruthenium oxide, iridium oxide and titanium oxide on a titanium punched metal and having a low chlorine overvoltage, was disposed to contact therewith. Then, electrolysis was conducted for one month at 90° C. at a current density of 30 A/dm$^2$ while maintaining the aqueous sodium chloride concentration in the anode compartment at a level of 210 g/liter and the sodium hydroxide concentration in the cathode compartment at a level of 49% by weight.

The coating thickness of the ZrO$_2$-containing copolymer B layer laminated on the cathode side, the ZrO$_2$ content (volume ratio) and the electrolytic performance of the multi-layer membrane (3) are shown in Table 2.

COMPARATIVE EXAMPLE 10

The electrolytic experiment was conducted in the same manner as in Example 16, except that the multi layer membrane (2) having no ZrO$_2$-containing copolymer B layer was used. The results are shown in Table 2.

TABLE 2

| | ZrO$_2$/ZrO$_2$ + copolymer B (volume ratio) | Coating thickness | Current efficiency (%) | Cell voltage (V) |
|---|---|---|---|---|
| Example 16-1 | 0.2 | 60 μm | 93.5 | 3.27 |
| Example 16-2 | 0.4 | 60 μm | 95.3 | 3.20 |
| Example 16-3 | 0.8 | 100 μm | 95.3 | 3.19 |
| Comparative Example 10 | Nil | Nil | 82 | 3.30 |

EXAMPLE 17

The electrolytic experiments were conducted in the same manner as in Example 16 by using the multi-layer membrane (3) provided with the ZrO$_2$-containing copolymer B layer with a volume content of ZrO$_2$ of 40% having a thickness of 60 μm as used in Example 16-2, except that the sodium hydroxide concentration in the cathode compartment was changed. The results are shown in Table 3.

TABLE 3

| NaOH concentration in cathode compartment | Current efficiency (%) | Cell voltage (V) | Days on line |
|---|---|---|---|
| 49% NaOH | 95.0 | 3.20 | Up to 14 |
| 35% NaOH | 95.0 | 3.10 | 15–18 |
| 30% NaOH | 94.8 | 3.07 | 19–21 |
| 25% NaOH | 94.5 | 3.05 | 22–27 |
| 20% NaOH | 94.0 | 3.02 | 28–35 |
| 30% NaOH | 94.7 | 3.06 | 36–38 |
| 40% NaOH | 95.0 | 3.14 | 39–41 |
| 49% NaOH | 95.0 | 3.19 | 42–50 |

EXAMPLE 18

A film of a CF$_2$=CF$_2$/CF$_2$=CFOCF$_2$CF(CF$_3$)O(CF$_2$)$_3$COOCH$_3$ copolymer (copolymer F) having an ion exchange capacity of 0.91 meq/g dry resin and a thickness of 40 μm was laminated with a film of a CF$_2$=CF$_2$/CF$_2$=CFOCF$_2$CF(CF$_3$)O(CF$_2$)$_2$SO$_2$F copolymer (copolymer G) having an ion exchange capacity of 0.91 meq/g dry resin and a thickness of 160 μm. Then, on the copolymer G layer side, the combined yarn fabric comprising the polytetrafluoroethylene and the polyester as used in Example 17 was laminated to obtain a reinforced multi-layer membrane (1).

Then, on the copolymer G layer, a ZrO$_2$ porous layer was laminated as a layer for releasing chlorine gas bubbles in the same manner as in Example 16 to obtain a multi-layer membrane (2).

Then, the multi layer membrane (2) was hydrolyzed with an aqueous solution containing potassium hydroxide and dimethylsulfoxide.

On the copolymer F side of the multi-layer membrane thus obtained, an ethanol solution of acid type copolymer B containing ZrO$_2$ particles having a particle size of 5 μm, was coated and dried to obtain a multi-layer membrane (3) provided with a ZrO$_2$-containing copolymer B layer (volume ratio of ZrO$_2$/copolymer B: 4/6).

The electrolytic experiment was conducted in the same manner as in Example 16 by using the multi-layer membrane (3) except that the sodium hydroxide concentration in the cathode compartment was changed to 42% by weight.

The relation between the coating amount of the ZrO$_2$-containing copolymer B layer and the current efficiency is shown in Table 4.

COMPARATIVE EXAMPLE 11

The electrolytic experiment was conducted in the same manner as in Example 18 except that the multi-layer membrane (2) having no ZrO$_2$-containing copolymer B layer was used. The results are shown in Table 4.

TABLE 4

| | Coating amount (g/m$^2$) | Thickness | Current efficiency at 42% NaOH (%) |
|---|---|---|---|
| Example 18-1 | 10 | 10 μm | 90.0 |
| Example 18-2 | 90 | 30 μm | 93.5 |
| Example 18-3 | 180 | 60 μm | 95.5 |
| Example 18-4 | 300 | 100 μm | 95.5 |
| Comparative Example 11 | Nil | | 89.0 |

EXAMPLE 19

60 Parts by volume of CF$_2$=CF$_2$/CF$_2$=CFOCF$_2$CF(CF$_3$)O(CF$_2$)$_2$SO$_2$F having an ion exchange capacity of 1.1 meq/g dry resin and 40 parts by volume of SiO$_2$ particles having a particle size of 2 μm were mixed by a roll mill and then extruded into a composite film having a thickness of 100 μm by an extruder.

This film was laminated under heating on the copolymer A side of the multi-layer membrane (2) as prepared in Example 16. Then, the membrane thus obtained was hydrolyzed and set in an electrolytic cell so that the composite film side is located at the cathode side. Then, the electrolysis was conducted at 90° C. at a current density of 30 A/dm² while maintaining the sodium hydroxide concentration in the cathode compartment at a level of 49%, whereby the cell voltage was 3.19 V and the current efficiency was 95.3%. No change was observed in the electrolytic performance after continuous operation of the electrolysis for one month.

EXAMPLE 20

By using the multi-layer membrane (3) provided with the $ZrO_2$-containing copolymer B layer having a thickness of 60 μm and a volume content of $ZrO_2$ of 40% as used in Example 16-2, the electrolysis was conducted at 90° C. at a current density of 30 A/dm² by maintaining the potassium chloride concentration at the outlet of the anode compartment at a level of from 170 to 180 g/liter and controlling the amount of water supplied to the cathode compartment so that the potassium hydroxide was withdrawn at a concentration of from 30 to 49% by weight. The results are shown in Table 5.

COMPARATIVE EXAMPLE 12

The potassium chloride electrolysis was conducted in the same manner as in Example 20 except that the multi-layer membrane (2) having no $ZrO_2$-containing copolymer B layer as described in Example 16 was used. The results are shown in Table 5.

TABLE 5

|  |  | 30% KOH | 35% KOH | 40% KOH | 45% KOH | 49% KOH |
|---|---|---|---|---|---|---|
| Example 20 | Current efficiency (%) | 95.5 | 95.7 | 95.8 | 96.0 | 96.0 |
|  | Cell voltage (V) | 3.10 | 3.24 | 3.31 | 3.33 | 3.35 |
| Comparative | Current efficiency (%) | — | 97.5 | 97.0 | 93.0 | 89 |
| Example 12 | Cell voltage (V) | — | 3.0 | 3.1 | 3.3 | 3.4 |

EXAMPLE 21

On the copolymer A side of the multi-layer membrane (2) prepared in Example 16, a paste of a mixture comprising $ZrO_2/SiO_2$ and an ethanol solution of acid type copolymer B, was coated and dried to obtain a multi-layer membrane (3) provided with a layer of a $ZrO_2/SiO_2$/copolymer B mixture having a thickens of 100 μm.

The multi-layer membrane (3) thus obtained was hydrolyzed in an aqueous sodium hydroxide solution. After the hydrolysis, the cross section of the membrane was observed, whereby it was found that a porous layer of $ZrO_2$/copolymer B was obtained by the elution of $SiO_2$.

By using this membrane, the electrolysis was conducted for one month in the same manner as in Example 16 at 90° C. at a current density of 30 A/dm² while maintaining the sodium chloride concentration at the outlet of the anode compartment at a level of 210 g/liter and the sodium hydroxide concentration at the outlet of the cathode compartment at a level of 49% by weight. The composition (volume %) of $ZrO_2/SiO_2$/copolymer B laminated on the cathode side and the electrolytic performance are shown in Table 6.

TABLE 6

| Example No. | $ZrO_2$ | $SiO_2$ | Copolymer B | Current efficiency (%) | Cell voltage (V) |
|---|---|---|---|---|---|
| 21-1 | 45 | 5 | 50 | 95.5 | 3.20 |
| 21-2 | 40 | 10 | 50 | 95.4 | 3.18 |
| 21-3 | 30 | 20 | 50 | 95.3 | 3.17 |

TABLE 6-continued

| Example No. | $ZrO_2$ | $SiO_2$ | Copolymer B | Current efficiency (%) | Cell voltage (V) |
|---|---|---|---|---|---|
| 21-4 | 5 | 45 | 50 | 94.8 | 3.16 |

We claim:

1. A method for producing an alkali metal hydroxide having a concentration of from 42 to 55% by weight by electrolysis in an electrolytic cell comprising an anode compartment and a cathode compartment, which comprises supplying an aqueous alkali metal chloride solution to the anode compartment and withdrawing an aqueous alkali metal hydroxide solution from the cathode compartment, wherein a fluorine-containing cation exchange membrane comprising a first and second layer is disposed with said first layer facing said cathode compartment, and wherein said first layer comprises an alkali resistant cation exchanger with a thickness of at least 5 μm, wherein said alkali resistant cation exchanger constituting said first layer is made of a perfluorocarbon polymer having —$SO_3M$ groups or —OM groups, wherein M is an alkali metal; and said second layer comprises a perfluorocarbon polymer having —$CO_2M$ groups, wherein M is an alkali metal, and has a water content of from 2 to 7% by weight in a 45 wt % NaOH aqueous solution with a thickness of at least 5 μm, wherein the first layer further comprises alkali resistant inorganic particles or fibrils which are at least one member selected from the group consisting of oxides, nitrides, carbides and hydroxides of elements in the third period et. seq. of groups IIa, IIIb, IVb, Vb, IIIa and IVa of the long form of the periodic table and have an average particle size or an average fibril diameter of at most 20 μm and at most ½ of the thickness of the first layer.

2. The method according to claim 1, wherein the content of the inorganic particles or fibrils is from 20 to 80% by volume in the first layer.

3. The method of claim 1, wherein the first layer has a Gurley number of at least 300 and a porosity of from 5 to 95%.

4. The method according to claim 1, wherein the second layer has thickness of up to 300 μm and an ion exchange capacity of from 0.85 to 1.6 meq/g dry resin.

5. The method according to claim 1, wherein the alkali resistant cation exchanger constituting the first layer is made of —$SO_3M$ groups having an ion exchange capacity of from 0.85 to 1.6 meq/g dry resin.

6. The method according to claim 1, wherein the fluorine-containing cation exchange membrane has, on the anode side of the second layer, a third layer of a perfluorocarbon polymer having cation exchange groups and having a specific resistance lower than the second layer and a thickness greater than the second layer.

7. The method according to claim 6, wherein the fluorine-containing cation exchange membrane has, on the anode side of the second layer or the third layer, a fourth layer of a porous fluorine-containing polymer having a thickness of from 10 to 450 μm and a porosity of from 30 to 95% with its surface and interior being hydrophilic.

8. The method according to claim 1, wherein the fluorine-containing cation exchange membrane has on at least one surface thereof a means for releasing gas bubbles.

9. The method according to claim 8, wherein the means for releasing gas bubbles is fine irregularities formed on the membrane surface.

10. The method according to claim 8, wherein the means for releasing gas bubbles is a deposit of hydrophilic inorganic particles.

11. The method according to claim 8, wherein the means for releasing gas bubbles is a gas and liquid permeable porous layer containing electrocatalytically inactive particles formed on the membrane surface.

12. The method according to claim 1, wherein the fluorine-containing cation exchange membrane has on the first layer a means for releasing hydrogen gas bubbles.

13. The method according to claim 1, wherein the fluorine-containing cation exchange membrane has on the second layer a means for releasing chlorine bubbles.

* * * * *